No. 765,667. PATENTED JULY 26, 1904.
H. E. KELLOGG.
VARIABLE SPEED DEVICE.
APPLICATION FILED JAN. 5, 1903.
NO MODEL. 3 SHEETS—SHEET 1.
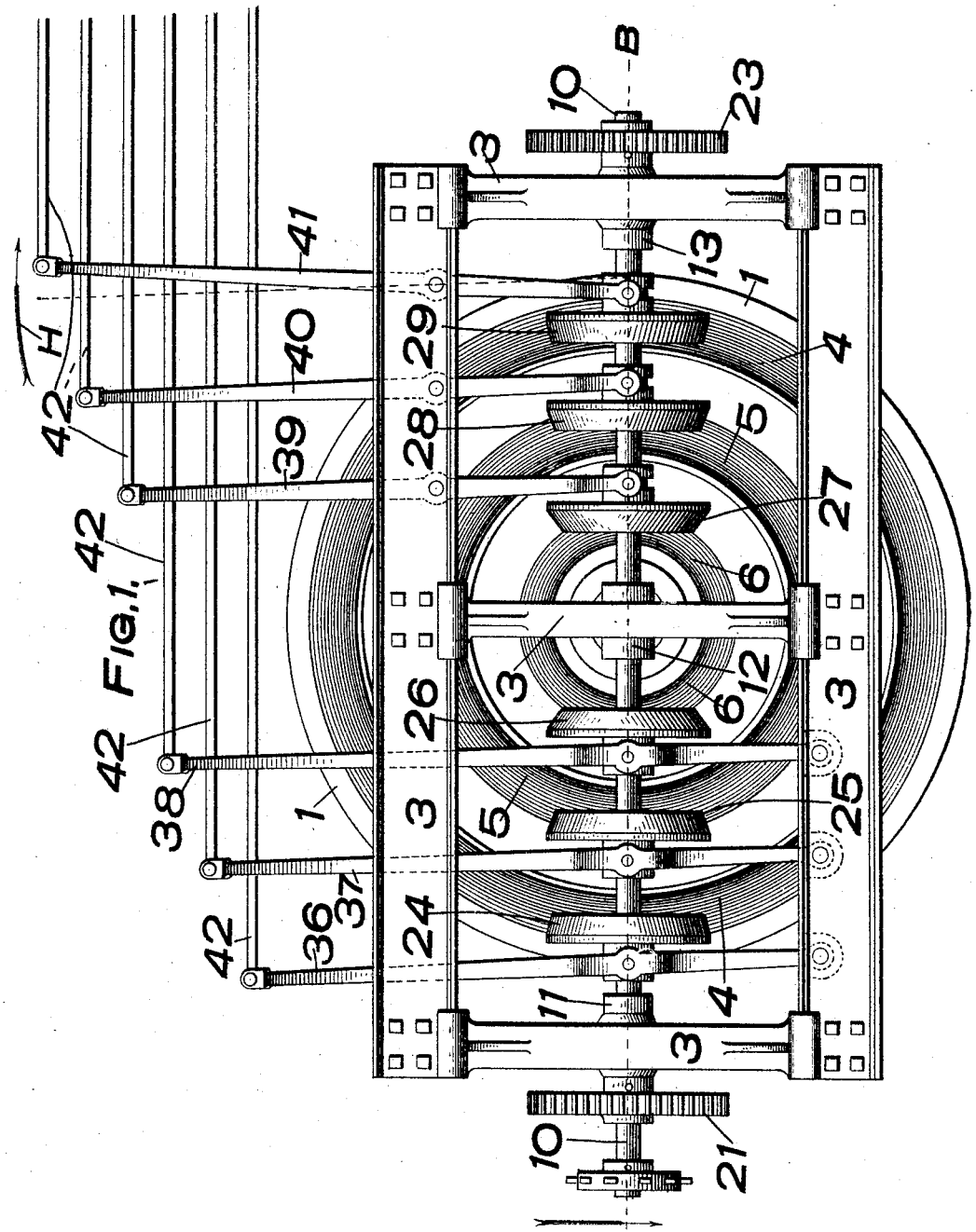
Witnesses:
Inventor:
Henry E. Kellogg,
By Oscar Snell
Atty No. 765,667. PATENTED JULY 26, 1904.
H. E. KELLOGG.
VARIABLE SPEED DEVICE.
APPLICATION FILED JAN. 5, 1903.
NO MODEL. 3 SHEETS—SHEET 2.
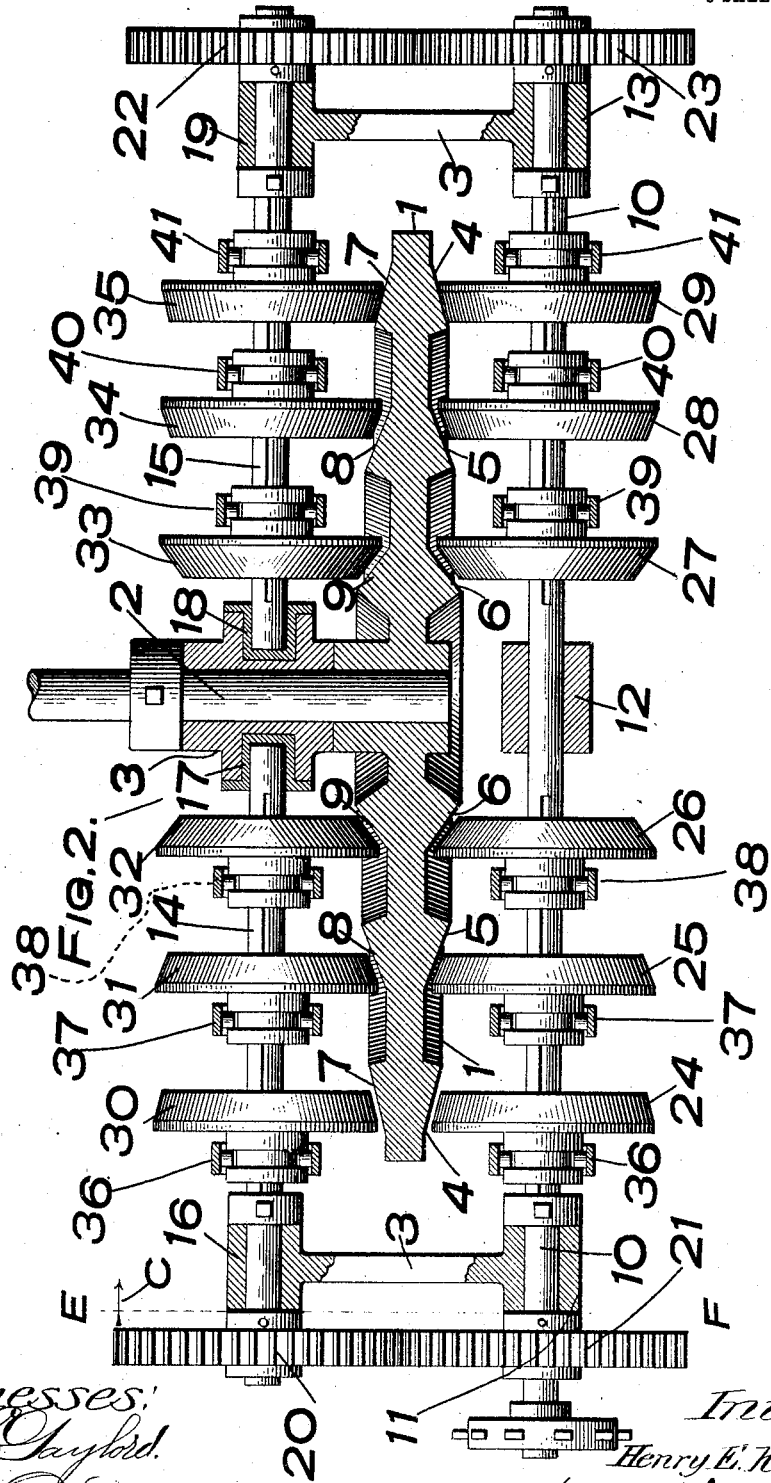
Witnesses:
Inventor,
Henry E. Kellogg,
By Oscar Snell
Atty No. 765,667.

Patented July 26, 1904.

UNITED STATES PATENT OFFICE.

HENRY E. KELLOGG, OF CHICAGO, ILLINOIS, ASSIGNOR OF ONE-HALF TO GEORGE F. SWAIN, OF HARVEY, ILLINOIS.

VARIABLE-SPEED DEVICE.

SPECIFICATION forming part of Letters Patent No. 765,667, dated July 26, 1904.

Application filed January 5, 1903. Serial No. 137,795. (No model.)

*To all whom it may concern:*

Be it known that I, HENRY E. KELLOGG, a citizen of the United States, residing at Chicago, in the county of Cook and State of Illinois, have invented a new and useful Variable-Speed Device, of which the following is a specification.

My invention relates to means for the transmission of power at a variable speed and in two directions of revolution, my object being to provide a construction which is particularly adapted to the heavy duty required in the transmission of power from the motor in propelling heavy motor-vehicles whether in use on ordinary roads or railways, the same being more particularly described hereinafter and illustrated in the accompanying drawings, in which—

Figure 1 is a side elevation of a frame with many of the operative parts mounted therein which comprise my invention. Fig. 2 is a plan showing parts of the frame and of a large friction-wheel and the yoke ends of several operating-levers broken away to an axial section indicated by broken line A B, Fig. 1. Fig. 3 is an end elevation looking in the direction indicated by arrow C, Fig. 2, but with two spur-gears and a chain-wheel removed and two shafts broken away on broken line E F, Fig. 2.

Similar numerals indicate like parts throughout the several views.

The large wheel 1 is mounted on the end portion of a shaft 2, which latter is mounted in bearings in frame 3. At both sides of wheel 1 are annular beveled faces, such as 4, 5, and 6 and 7, 8, and 9.

At one side of wheel 1 is mounted a shaft 10, which latter extends entirely across in front of wheel 1 from one end of frame 3 to the other, being mounted in bearings at 11, 12, and 13. At the opposite side of wheel 1 from shaft 10 are mounted in bearings 16 17 and 18 19, respectively, shafts 14 and 15.

Spur-wheels 20 and 21 connect shaft 14 with one end of shaft 10, and spur-wheels 22 and 23 connect the opposite end of shaft 10 with shaft 15.

Beveled wheels 24, 25, 26, 27, 28, and 29 are slidingly mounted on splines on shaft 10, half the number of these wheels being disposed at each side of the center of wheel 1, each with its beveled face in close proximity to some one of the annular beveled faces 4, 5, and 6 of wheel 1. The beveled-faced wheels 30, 31, 32, 33, 34, and 35 are mounted on shafts 14 and 15 in a manner the same as the wheels on shaft 10, but have their beveled faces in close proximity to the annular beveled faces 7, 8, and 9 of wheel 1 and one-half of the number at each side of the center of the last-named wheel. All the beveled wheels on shafts 10, 14, and 15 have hubs, of which each is provided with a peripheral groove for the engagement of the operating-lever for sliding it on its shaft. The levers 36, 37, 38, 39, 40, and 41, engaged with these hubs, are really double, since they are bifurcated, as seen in Fig. 3, where lever 36 only is shown in order not to complicate the drawing. The other levers are each longer than lever 36 and each longer than the lever preceding it, as seen on reference to the drawings, wherein lever 41 is shown longer than lever 40 and lever 40 longer than lever 39. Levers 37 to 40, inclusive, extend across the operating-rods 42 of said levers, and the latter numbered levers each straddle the operating-rods 42 of 36 to 40, inclusive, as seen in Fig. 1. The levers may be made single and secured together, so as to form pairs adapted to be operated each pair by a single rod, such as 42, to attain simplicity.

The beveled wheels, such as 30 and 24 and 31 and 25, which are directly opposite at the sides of wheel 1, as well as all the other side beveled wheels similarly disposed, form pairs, of which each pair is singly brought into contact with the annularly-beveled oppositely-disposed faces of wheel 1, which couples or places in running engagement shafts 14 or 15 with shaft 10.

Levers 36, 37, and 38, which respectively operate into and out of engagement side wheel pairs 30 24, 31 25, and 32 26 are pivotally mounted at the lower ends in the base of frame 3, and levers 39, 40, and 41 are pivotally mounted intermediate their length in the upper part of the frame, this arrangement being such that levers 36, 37, and 38 are engaged with the hubs of wheel pairs 30 24, 31 25, and 32 26 at the intermediate portion of their length, while levers 39, 40, and 41 have the lower ends thereof in engagement with the hubs of the wheel pairs 33 27, 34 28, and 35 29, as seen in Fig. 2.

By reference to Fig. 2 it will be seen that wheel pairs 35 29 have been brought into contact, respectively, with the outside annular beveled surfaces 7 and 4 of wheel 1, the placing into engagement of this pair having been accomplished by moving lever 41, Fig. 1, from a vertical position (indicated by a broken line) to the inclined position shown, so that the lower ends of the lever have moved the pair simultaneously inwardly or toward the center of wheel 1 until the beveled faces of the latter and of the pair of wheels have been brought into close and firm contact, with the result that they are adapted to transmit power in either direction of revolution from the pair to wheel 1 or from the latter to the pair, as may be desired, and this is also true of all the other pairs in their relation to wheel 1 and in the relation of the latter to each pair. The main object of this invention, however, is to employ wheel 1 as the driver, and it may serve as the fly-wheel of an internal-combustion engine and ordinarily would revolve but in one direction; yet this system of mechanism is such that the movement toward the center of wheel 1 of any pair of wheels controlled by levers 36, 37, or 38 would result in a revolution of shafts 14 and 10 in opposite directions, but the motion of shaft 10 would be in a certain direction, and if these wheels are released and any one pair of wheels controlled by levers 39, 40, and 41 be moved toward the center of wheel 1 shaft 10 would be revolved in a direction opposite to that of the first-named certain direction, and in either direction power may be transmitted therefrom by means of the chain-wheel shown at the end near spur-wheel 21 or from any other means connected with either of the shafts, since the spur-wheels positively connect shafts 10, 14, and 15, as stated.

On account of the difference in diameter of the annular beveled surfaces of wheel 1 and the practically uniform sizes of the different pairs of wheels, which may differ in size considerably, it is obvious that in addition to motion in two directions of revolution a variable speed may be transmitted also and that on account of wheel 1 being simultaneously engaged from both sides a very regular and even result may be attained when transmitting a heavy power duty and at a high rate of speed, thus particularly adapting this system of mechanism to the purpose intended.

As clearly shown on the drawings, the pitch or beveled engaging surfaces of the several friction-wheels are varied and made at gradually-increasing angles of inclination in a direction from the outer annular beveled faces of the main driving or friction wheel toward the axis of rotation thereof in such a manner that all portions of said engaging beveled surfaces shall contact, so that friction between the surfaces and slipping of one surface over another may be eliminated so far as possible.

From the above description it will be obvious that the improved frictional transmitting device may be connected with and driven from a suitable source of power in various ways, and while I have herein referred to the main driving or friction wheel as being mounted upon a main motor or driving shaft it is evident that said wheel may equally well be mounted upon a driven shaft and the several peripherally-beveled friction-wheels may be operated from a driving shaft or shafts operated from a suitable source of power.

I claim as my invention—

1. In a variable-speed device, a shaft and a friction-wheel mounted thereon, a side shaft and a plurality of friction-wheels mounted thereon and having the peripheral surfaces thereof disposed in close proximity to the surface at one side of the first-named wheel, and two side shafts, and a plurality of friction-wheels mounted thereon, with the peripheral surfaces thereof in close proximity to the first-named wheel but at the opposite side from the second-named shaft and wheels and in pairs with the latter, and means for placing the pairs of wheels of the side shafts into and out of engagement with the first-named wheel, for the purpose stated.

2. A variable-speed device comprising a revoluble shaft with a friction-wheel mounted thereon, the wheel having a plurality of annular beveled surfaces at each side face, a shaft revolubly mounted entirely across before and substantially concentric with one of the side surfaces of the said wheel, and two other shafts each revolubly mounted partially across before and substantially concentric with the other side surface, a plurality of peripherally-beveled wheels slidingly mounted on the three last-named shafts but adapted to revolve with the shafts, the oppositely-disposed wheels being in pairs, and means adapted to move any one of the pairs independent of the other pairs into and out of engagement with the beveled surfaces of the first-named wheel, for the purpose stated.

3. In a variable-speed device a shaft, a friction-wheel mounted thereon, having a plurality of annular beveled surfaces on each of its side faces, shafts mounted at each side of said friction-wheel, a plurality of peripherally-beveled friction-wheels slidably mounted on said last-named shafts and adapted for rotation therewith, means for simultaneously moving the oppositely-disposed friction-wheels carried by said shafts into and out of engagement with the first-named friction-wheel, and means for connecting the last-named shafts, substantially as described.

4. In a variable-speed device of the character described the combination with the main shaft of a main friction-wheel mounted thereon, having a series of annular surfaces upon its two side faces, a side shaft extending across said friction-wheel, a plurality of friction-wheels carried thereby, a pair of side shafts arranged at the opposite side of said friction-wheel, friction-wheels carried thereby and oppositely arranged with respect to the wheels of the first-named said shaft, means for moving any two of said oppositely-arranged wheels into and out of engagement with said first-named friction-wheel.

5. In a variable-speed device of the character described, the combination with the main shaft and the main friction-wheel carried thereby, a pair of side shafts arranged at one side of said wheel, friction-wheels slidably mounted upon said shafts, means for sliding each of said friction-wheels independently of the others, and a side shaft arranged at the opposite side of said friction-wheel, friction-wheels slidably mounted thereon and oppositely disposed with relation to the friction-wheels of the first-named side shafts, means for independently moving each of said friction-wheels, means connecting said last-named side shaft with the first-named side shafts, and means for actuating any two of the oppositely-arranged friction-wheels simultaneously whereby the same may engage with the main friction-wheel, substantially as described.

6. In a frictional power-transmitting mechanism, the combination of a pair of transmission-wheels having beveled faces and mounted shiftably upon their axes and disposed diametrically opposite each other, a driving-shaft supported at right angles to the axes of said wheels, a driving-wheel secured to said shaft and disposed between said transmission-wheels and provided on opposite sides with annular friction-surfaces beveled correspondingly with the transmission-wheels, means for shifting the latter into and out of frictional contact with the driving-wheel, and means imparting rotary motion to said wheels.

7. In a frictional power-transmitting mechanism, the combination of a pair of transmission-wheels disposed diametrically opposite each other, a driving-wheel disposed between said transmission-wheels, a reversing-wheel adjacent to the driving-wheel, means for moving the transmission-wheels and reversing-wheel into and out of frictional contact with the driving-wheel, and means imparting rotary motion to said wheels.

8. The combination of two shafts which coöperate and are arranged parallel with each other, two sets of transmission-wheels mounted axially shiftable on said coöperating parallel shafts, each wheel of one set being diametrically opposite a wheel of the other set to form pairs, another shaft, a driving-wheel secured thereto and disposed between the two sets of transmission-wheels and means for simultaneously and independently shifting each pair of transmission-wheels into and out of frictional contact with the driving-wheel.

9. The combination of two parallel shafts one of which is rotated by the other, two sets of transmission-wheels mounted axially shiftable on the respective parallel shafts and provided with beveled faces, each wheel of one set being diametrically opposite a wheel of the other set to form pairs, another shaft, a driving-wheel secured thereto and disposed between the sets of transmission-wheels and provided on opposite sides with concentric annular friction-surfaces beveled correspondingly with the transmission-wheels, and means for simultaneously and independently shifting each pair of transmission-wheels into and out of contact with said driving-wheel.

10. The combination of a set of transmission-wheels provided with friction-faces beveled successively at gradually-increasing angles of inclination and supported axially shiftable, a driving-wheel provided on its side with concentric annular friction-surfaces beveled correspondingly with said transmission-wheels, means for independently shifting said transmission-wheels into and out of contact with said driving-wheel, and means imparting rotary motion to said wheels.

11. The combination of two parallel shafts geared to turn in unison, two sets of transmission-wheels mounted axially shiftable on the respective parallel shafts, each wheel of one set being diametrically opposite a wheel of the other set to form pairs having friction-faces beveled successively at gradually-increasing angles of inclination, another shaft, a driving-wheel secured thereto and disposed between said sets of transmission-wheels and provided on opposite sides with concentric annular friction-surfaces beveled correspondingly with the transmission-wheels, and means for shifting said pairs of transmission-wheels independently into and out of frictional contact with the driving-wheel.

12. The combination with two shafts, of transmission-wheels rotated by one shaft, a driving-wheel secured to the other shaft, means for effecting frictional engagement of the transmission-wheels with the driving-wheel, another shaft, a reversing-wheel secured thereto adjacent to the periphery of the driving-wheel, meshing gears secured to said last-named shaft and to the shaft of the transmission-wheels respectively, and means for effecting frictional contact of said reversing-wheel with said driving-wheel.

In testimony whereof I have signed my name to this specification in the presence of two subscribing witnesses.

HENRY E. KELLOGG.

Witnesses:
OSCAR SNELL,
ALBERT E. EBERT.